United States Patent
Soon et al.

(10) Patent No.: US 11,972,210 B2
(45) Date of Patent: Apr. 30, 2024

(54) SYSTEM AND METHOD FOR PREDICTING A PENAL CODE AND MODIFYING AN ANNOTATION BASED ON THE PREDICTION

(71) Applicant: MOTOROLA SOLUTIONS, INC., Chicago, IL (US)

(72) Inventors: Guan Lip Soon, Georgetown (MY); Tih Huang Yeoh, Kangar (MY); Mouk Pio Kang, Bukit Mertajam (MY)

(73) Assignee: MOTOROLA SOLUTIONS, INC., Chicago, IL (US)

(*) Notice: Subject to any disclaimer, the term of this patent is extended or adjusted under 35 U.S.C. 154(b) by 317 days.

(21) Appl. No.: 17/319,178

(22) Filed: May 13, 2021

(65) Prior Publication Data
US 2022/0366141 A1 Nov. 17, 2022

(51) Int. Cl.
G06F 40/284 (2020.01)
G06F 40/169 (2020.01)
G06N 20/00 (2019.01)
G06Q 30/018 (2023.01)
G06Q 50/26 (2024.01)
G06V 20/40 (2022.01)

(52) U.S. Cl.
CPC .......... *G06F 40/284* (2020.01); *G06F 40/169* (2020.01); *G06N 20/00* (2019.01); *G06Q 30/018* (2013.01); *G06Q 50/26* (2013.01); *G06V 20/41* (2022.01)

(58) Field of Classification Search
CPC .... G06F 40/284; G06F 40/169; G06F 18/214; G06F 40/30; G06F 40/242; G06F 40/289; G06F 40/40; G06N 20/00; G06Q 30/018; G06Q 50/26; G06V 20/41
See application file for complete search history.

(56) References Cited

U.S. PATENT DOCUMENTS

| 7,379,879 B1* | 5/2008 | Sloo ............... G06Q 50/265 |
| | | 705/325 |
| 8,189,905 B2 | 5/2012 | Eaton et al. |
| 10,514,837 B1* | 12/2019 | Li ..................... G06F 16/29 |

(Continued)

FOREIGN PATENT DOCUMENTS

CN 104834686 12/2018

OTHER PUBLICATIONS

Krzystanek, Przemyslaw, et al.: "System and Method for Improving Admissibility of Electronic Evidence", Serial No. PCT/PL2020/050081, filed: Nov. 10, 2020, all pages.

(Continued)

*Primary Examiner* — Bhavesh M Mehta
*Assistant Examiner* — Philip H Lam (57) ABSTRACT

Techniques for predicting a penal code and modifying an annotation based on the prediction are provided. A sentence describing a scene captured with a video capture device may be received form a video description system. The scene may depict a criminal act. An artificial intelligence bot may identify a penal code that has the highest probability of being associated with the criminal act described by the sentence. The sentence may be modified based on a lexicon associated with the identified penal code. Feedback indicating if the identification of the penal code was correct may be received. The feedback may be used to train the artificial intelligence bot.

15 Claims, 9 Drawing Sheets

(56) References Cited

U.S. PATENT DOCUMENTS

| | | | | |
|---|---|---|---|---|
| 10,733,457 | B1* | 8/2020 | Agnihotram | G08B 13/19602 |
| 11,558,679 | B1* | 1/2023 | Nixon | H04N 21/4402 |
| 2008/0027888 | A1* | 1/2008 | Azzam | G06F 40/30 |
| | | | | 706/45 |
| 2012/0268269 | A1* | 10/2012 | Doyle | G08B 21/22 |
| | | | | 340/539.13 |
| 2013/0262076 | A1* | 10/2013 | Kamatani | G06F 40/51 |
| | | | | 704/2 |
| 2013/0282747 | A1 | 10/2013 | Cheng et al. | |
| 2014/0283055 | A1* | 9/2014 | Zahran | G06F 16/353 |
| | | | | 726/23 |
| 2017/0251182 | A1* | 8/2017 | Siminoff | H04N 5/91 |
| 2018/0211113 | A1* | 7/2018 | Wu | H04N 7/183 |
| 2019/0258671 | A1* | 8/2019 | Bou | G06F 16/7867 |

OTHER PUBLICATIONS

Haonan Yu, Jiang Wang, Zhiheng Huang, Yi Yang, Wei Xu: "Video Paragraph Captioning Using Hierarchical Recurrent Neural Networks", arXiv:1510.07712v2, Apr. 6, 2016, all pages.

Porter, Curtis et al.: "Methods and Apparatus for Automated Review of Public Safety Incident Reports", Serial No. 126/719275, filed: Dec. 18, 2019, all pages.

* cited by examiner

SYSTEM AND METHOD FOR PREDICTING A PENAL CODE AND MODIFYING AN ANNOTATION BASED ON THE PREDICTION

BACKGROUND

Most countries in the world have laws, referred to as statutes, defining crimes and punishments associated with those crimes. The collection of those statutes may be referred to as the penal code. Each law within the penal code may list the elements that constitute a violation. For example, a battery may be defined as 1) causing bodily injury to another person or 2) making physical contact of an insulting nature to another person. As another example, assault may be defined as 1) engaging in conduct which places another in reasonable apprehension of receiving a battery.

The penal code in many places is long with many different crimes defined. In some cases, the crimes may have similar elements. For example, a person who pretends to punch another and makes slight contact could potentially be charged with assault. However, depending on if the level of contact could be considered insulting, the person could alternatively be charged with battery. In some cases, the penalties for similar conduct can carry significantly different punishment based on the specific penal code violated. When investigating a crime, a law enforcement officer may be tasked with selecting under which portion of the penal code a suspect should be charged.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

In many cases, law enforcement officers, such as police officers, do not witness firsthand the criminal act. Instead, their investigation may focus on evidence, such as witness statements or scientific forensic evidence. Given the ever increasing presence of surveillance cameras in both public and private spaces, video evidence is becoming increasingly popular for use in investigating and charging suspects who violate the penal code.

A problem may arise in that when viewing video evidence, a police officer may be unsure as to which specific penal code has been violated. The techniques described herein provide for an automated video annotation system that attempts to characterize what is occurring in a video scene by summarizing the video content via several descriptive sentences. The sentences may be coordinated with different time frames within the video. Once the sentences describing the video are created, they may be analyzed with an Artificial Intelligence (AI) bot to identify the most likely penal code violation.

Upon determination of the most likely penal code violation, the language of the sentence describing the video may be modified to conform with a lexicon associated with the specific violation. When the suspect is actually charged with a crime, the specific penal code violation charged can be returned to the AI bot to see if the AI bot correctly predicted the violation. This feedback can be used to further train the AI bot, through a process such as reinforcement learning. The training will cause the AI bot's predictions to become more accurate as further feedback is received.

A method is provided. The method includes receiving, from a video description system, a sentence describing a scene captured with a video capture device, the scene depicting a criminal act. The method further includes identifying, using an artificial intelligence bot, a penal code that has the highest probability of being associated with the criminal act described by the sentence. The method further includes modifying the sentence based on a lexicon associated with the identified penal code. The method further includes receiving feedback that indicates if the identification of the penal code was correct, wherein the feedback is used to train the artificial intelligence bot.

In one aspect, the feedback utilized is reinforcement learning. In one aspect, the method includes receiving a plurality of sentences describing the scene depicting the criminal act, each sentence associated with a time period of the scene. The method further includes identifying, using the artificial intelligence bot, the penal code that has the highest probability of being associated with each sentence. The method further includes ranking the sentences based on a severity level of the identified penal code. The method further includes modifying the plurality of sentences based on the lexicon associated with the identified penal code of the highest ranked sentence.

In one aspect, the method includes receiving a plurality of sentences describing the scene depicting the criminal act, each sentence associated with a time period of the scene. The method further includes identifying, using the artificial intelligence bot, a threat level associated with each sentence. The method further includes ranking the sentences based on the threat level, wherein the highest ranking sentence is used to identify the penal code with the highest probability of being associated with the criminal act described by the sentence. The method further includes modifying the plurality of sentences based on the lexicon associated with the highest ranked sentence.

In one aspect, the method includes assigning a threat level to each actor in a sentence. The method further includes computing a cumulative threat level for each actor. The method further includes assigning an offender role to the actor with the highest cumulative threat level. In one aspect, the threat level is based on at least one of time, motion, and actor stress factor.

A system is provided. The system includes a processor. The system includes a memory coupled to the processor containing a set of instructions thereon that when executed by the processor cause the processor to receive, from a video description system, a sentence describing a scene captured with a video capture device, the scene depicting a criminal act. The instructions further cause the processor to identify, using an artificial intelligence bot, a penal code that has the highest probability of being associated with the criminal act described by the sentence. The instructions further cause the processor to modify the sentence based on a lexicon associated with the identified penal code. The instructions further cause the processor to receive feedback that indicates if the identification of the penal code was correct, wherein the feedback is used to train the artificial intelligence bot.

In one aspect, the feedback utilized is reinforcement learning. In one aspect the system further comprises instructions to receive a plurality of sentences describing the scene depicting the criminal act, each sentence associated with a time period of the scene. The system further comprises instructions to identify, using the artificial intelligence bot, the penal code that has the highest probability of being associated with each sentence. The system further comprises instructions to rank the sentences based on a severity level of the identified penal code. The system further comprises instructions to modify the plurality of sentences based on the lexicon associated with the identified penal code of the highest ranked sentence.

In one aspect the system further comprises instructions to receive a plurality of sentences describing the scene depicting the criminal act, each sentence associated with a time period of the scene. The system further comprises instructions to identify, using the artificial intelligence bot, a threat level associated with each sentence. The system further comprises instructions to rank the sentences based on the threat level, wherein the highest ranking sentence is used to identify the penal code with the highest probability of being associated with the criminal act described by the sentence. The system further comprises instructions to modify the plurality of sentences based on the lexicon associated with the highest ranked sentence.

In one aspect the system further comprises instructions to assign a threat level to each actor in a sentence. The system further comprises instructions to compute a cumulative threat level for each actor. The system further comprises instructions to assign an offender role to the actor with the highest cumulative threat level. In one aspect, the threat level is based on at least one of time, motion, and actor stress factor.

A non-transitory processor readable medium containing a set of instructions thereon is provided. The instructions that when executed by a processor cause the processor to receive, from a video description system, a sentence describing a scene captured with a video capture device, the scene depicting a criminal act. The instructions further cause the processor to identify, using an artificial intelligence bot, a penal code that has the highest probability of being associated with the criminal act described by the sentence. The instructions further cause the processor to modify the sentence based on a lexicon associated with the identified penal code. The instructions further cause the processor to receive feedback that indicates if the identification of the penal code was correct, wherein the feedback is used to train the artificial intelligence bot.

In one aspect, the feedback utilized is reinforcement learning. In one aspect the medium further comprises instructions to receive a plurality of sentences describing the scene depicting the criminal act, each sentence associated with a time period of the scene. The medium further comprises instructions to identify, using the artificial intelligence bot, the penal code that has the highest probability of being associated with each sentence. The medium further comprises instructions to rank the sentences based on a severity level of the identified penal code. The medium further comprises instructions to modify the plurality of sentences based on the lexicon associated with the identified penal code of the highest ranked sentence.

In one aspect the medium further comprises instructions to receive a plurality of sentences describing the scene depicting the criminal act, each sentence associated with a time period of the scene. The medium further comprises instructions to identify, using the artificial intelligence bot, a threat level associated with each sentence. The medium further comprises instructions to rank the sentences based on the threat level, wherein the highest ranking sentence is used to identify the penal code with the highest probability of being associated with the criminal act described by the sentence. The medium further comprises instructions to modify the plurality of sentences based on the lexicon associated with the highest ranked sentence.

In one aspect the medium further comprises instructions to assign a threat level to each actor in a sentence. The medium further comprises instructions to compute a cumulative threat level for each actor. The medium further comprises instructions to assign an offender role to the actor with the highest cumulative threat level. In one aspect, the threat level is based on at least one of time, motion, and actor stress factor.

Further advantages and features consistent with this disclosure will be set forth in the following detailed description, with reference to the figures.

Figure 1:
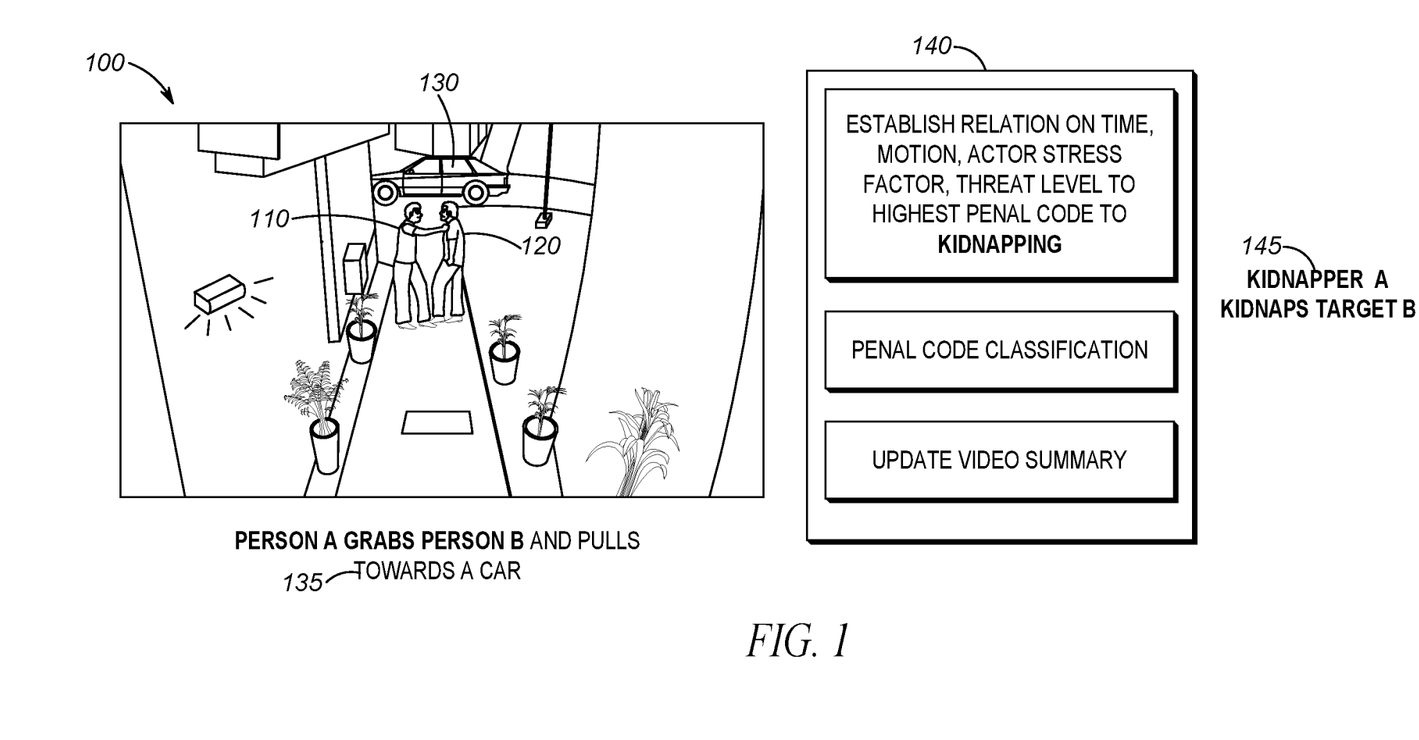
FIG. 1 is an example of predicting a penal code and modifying an annotation of a video segment based on the prediction, in accordance with the techniques described herein.

FIG. 1 is an example of predicting a penal code and modifying an annotation of a video segment based on the prediction, in accordance with the techniques described herein. FIG. 1 is intended to introduce, at a high level, the techniques described herein. FIG. 1 depicts a segment of a video 100 which has been annotated to describe what is occurring in the video. In this example, there are three elements, Person A 110, Person B 120, and a Car 130 that have been tagged as identified objects within the scene.

The automatic annotation can be done by any number of available techniques, and the techniques described herein are usable with any current or future developed video annotation techniques. The video annotation techniques do not necessarily need to be specialized to provide annotation for law enforcement purposes. Examples of video annotation techniques are described below. As will become clear further below, the techniques described herein can be used to convert generalized video annotation to an annotation that uses a lexicon that is more appropriate for law enforcement purposes vs annotations that are meant for general consumption.

In the video segment, Person A 110 appears to be grabbing person B and pulling them towards the Car 130. Thus, the video annotation system may annotate the video segment 135 as, "Person A grabs Person B and pulls towards a Car."

An AI bot 140 may analyze the video annotation to determine possible penal code violations. In some implementations, the AI bot may use hyponyms (a more specific word for a more general category) to expand the words used in the annotation to better align with the words used in a penal code. For example, a knife is a hyponym for a weapon. If the video annotation states, Person A holds a weapon, the AI bot may also substitute in knife. In some implementations, the system may use hypernyms (a more general category for a specific word). For example, a weapon is a hypernym for a knife. If the video annotation was Person A holds a knife, The AI Bot may also substitute weapon for knife.

The use of hyponyms and hypernyms may be beneficial in identifying a specific crime. For example, a penal code may define a crime of assault with a deadly weapon, but does not specify the type of weapon. By converting the word knife to weapon, there is a greater possibility of matching the video annotation to the penal code. Likewise, the penal code may have different code violations based on the type of weapon used. Thus, if weapon was converted to knife, a different penal code may be implicated.

The AI bot may establish relationships between the objects based on time, motion, actor stress factor, threat levels. The AI bot may then determine possible correlations of penal code violations to the annotation and the percentage confidence for those determinations. For example, in the present example, the AI bot may determine that there is an 80% chance that this is a kidnapping, a 70% chance that this is a hostage taking scenario, and a 60% chance that this is a robbery.

Once the penal code with the highest probability of correctness (e.g. kidnapping) is identified, the system may alter the annotations to be in terms of the lexicon of the crime of kidnapping. For example, a kidnapping will generally include a kidnapper (e.g. the person doing the kidnapping) and a target (e.g. the person being kidnapped). The original annotation may be modified 145 to read, "Kidnapper A kidnaps Target B."

In order for the system to continuously improve, feedback about the correctness of the penal code identification can be fed back to the AI Bot 140 for purposes of allowing the AI Bot to refine the model it uses to identify the penal code violation. A correct identification (e.g. the suspect was actually charged with the identified crime) would provide positive feedback (e.g. a reward) while an incorrect prediction would provide negative feedback. Such a process is generally referred to as reinforcement learning. It should be understood that the techniques describe herein are not limited to reinforcement learning.

It should be further understood that the AI Bot 140 could be trained using a labeled training data set that consists of annotations of video segments and the final penal code violation that was charged. Using machine learning techniques, the AI Bot may train a model to identify the penal code that has the highest probability of having been violated in the annotated video segment.

Figure 2:
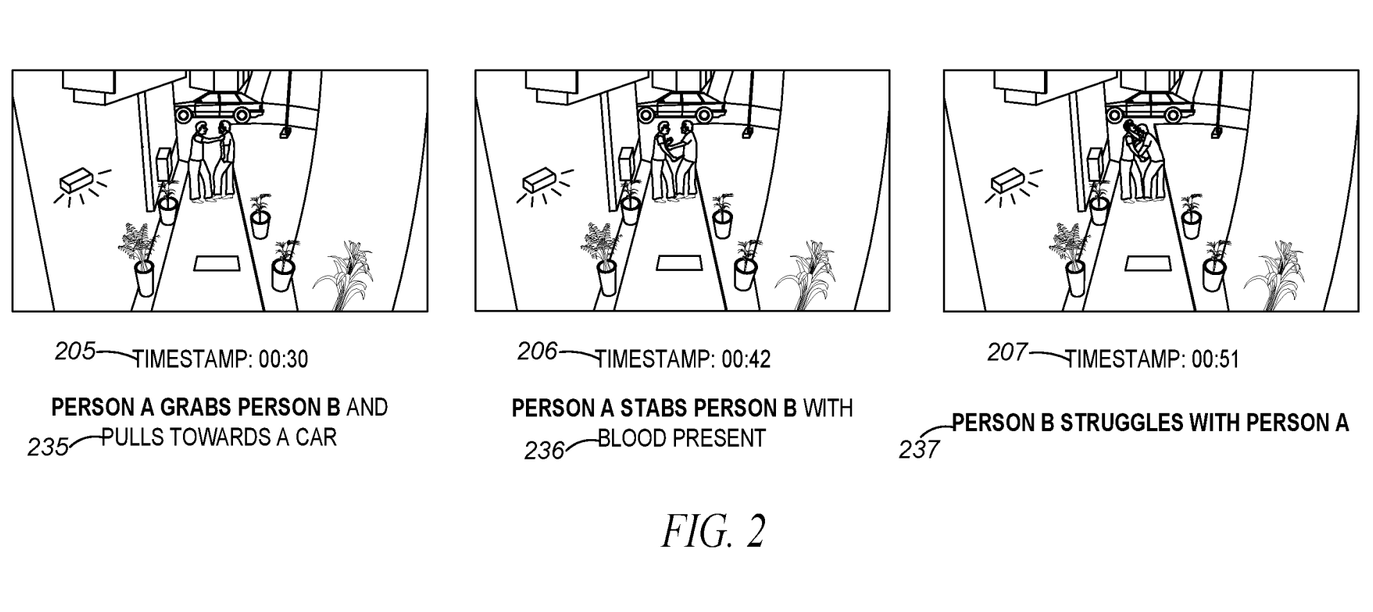
FIG. 2 is an example of predicting a penal code and modifying annotations of a video segment based on the prediction for a multiple sentence video annotation, in accordance with the techniques described herein.

FIG. 2 is an example of predicting a penal code and modifying an annotation of a video segment based on the prediction for a multiple sentence video annotation, in accordance with the techniques described herein. In a real world environment, it is likely that a single sentence is not sufficient to annotate a video segment depicting a crime in progress. For example, multiple different actions may occur in a scene at different points in time. Each segment of time may then be associated with a sentence annotating that segment of time. Techniques for determining when new sentences are created (e.g. different time segments) are described in further detail below.

As shown in FIG. 2, the same video segment described in FIG. 1 is presented. In the initial time segment at 00:30 205, the same video annotation, "Person A grabs Person B and pulls towards a car" 235 is generated. At time 00:42 206 a new sentence may be generated, such as "Person A stabs Person B with Blood Present" 236. At time 00:51 207 another sentence may be generated, "Person B struggles with person A" 237.

In one implementation, each sentence may be individually associated with a particular penal code violation, just as it was above. For example, the first sentence could be associated with kidnapping, hostage taking, and robbery, with the same probabilities as above. The same process of predicting penal codes could take place with respect to the sentence generated at time 00:42. This may result in prediction of attempted murder 90%, assault with deadly weapon with bodily injury 85%, and assault with a deadly weapon 80%. Processing the third sentence may result in a prediction of Battery 80%, Domestic Abuse 65%, and disorderly conduct 30%.

The highest probability for each sentence may then be compared against each other to rank order the severity of the crimes. For example, assume attempted murder is considered a more severe crime than kidnapping and kidnapping is considered a more severe crime than battery. In some implementations, the most severe penal code violation may be used to select the lexicon that will be used to modify the video annotations. In the present example, the most severe penal code violation would be attempted murder. The sentences could then be modified based on the lexicon that is associated with that penal code. For example, in the case of attempted murder, the subject identification terminology may be Assailant for the person who is the aggressor and victim for the person who is the subject of the aggression. The sentences could be modified to read, "Assailant A grabs Victim B and pulls towards a car. Assailant A attempts to murder Victim B. Victim B struggles with assailant A."

In another implementation, rather than determining a penal code associated with each sentence, a threat level may be associated with each sentence. The sentence including the highest threat level may then be compared to the penal code by the AI bot to determine the appropriate penal code. In the example, presented above, the threat level for the first sentence may have been classified as the greatest threat. In such case, the crime of kidnapping may be the most appropriate penal code violation to select. The annotations could then be modified to be in terms used with kidnapping (e.g. kidnapper, target, etc.). The process of threat level determination will be described in further detail below.

In addition to determining the threat levels of each sentence, threat levels for individual actors may be determined. These threat levels may be used to determine which actor in a description is an offender and which actor is the victim. Consider a case of a video depicting a kidnapping. In one segment of the video, the victim may hit the kidnapper in an attempt to get away. In isolation, such a description would make the actual victim appear to be the offender. By analyzing the threat level of each actor, it can be determined which actor is more likely the offender, as they would generally pose the greatest threat. Techniques to create the threat level for each actor are described in further detail below.

Figure 3:
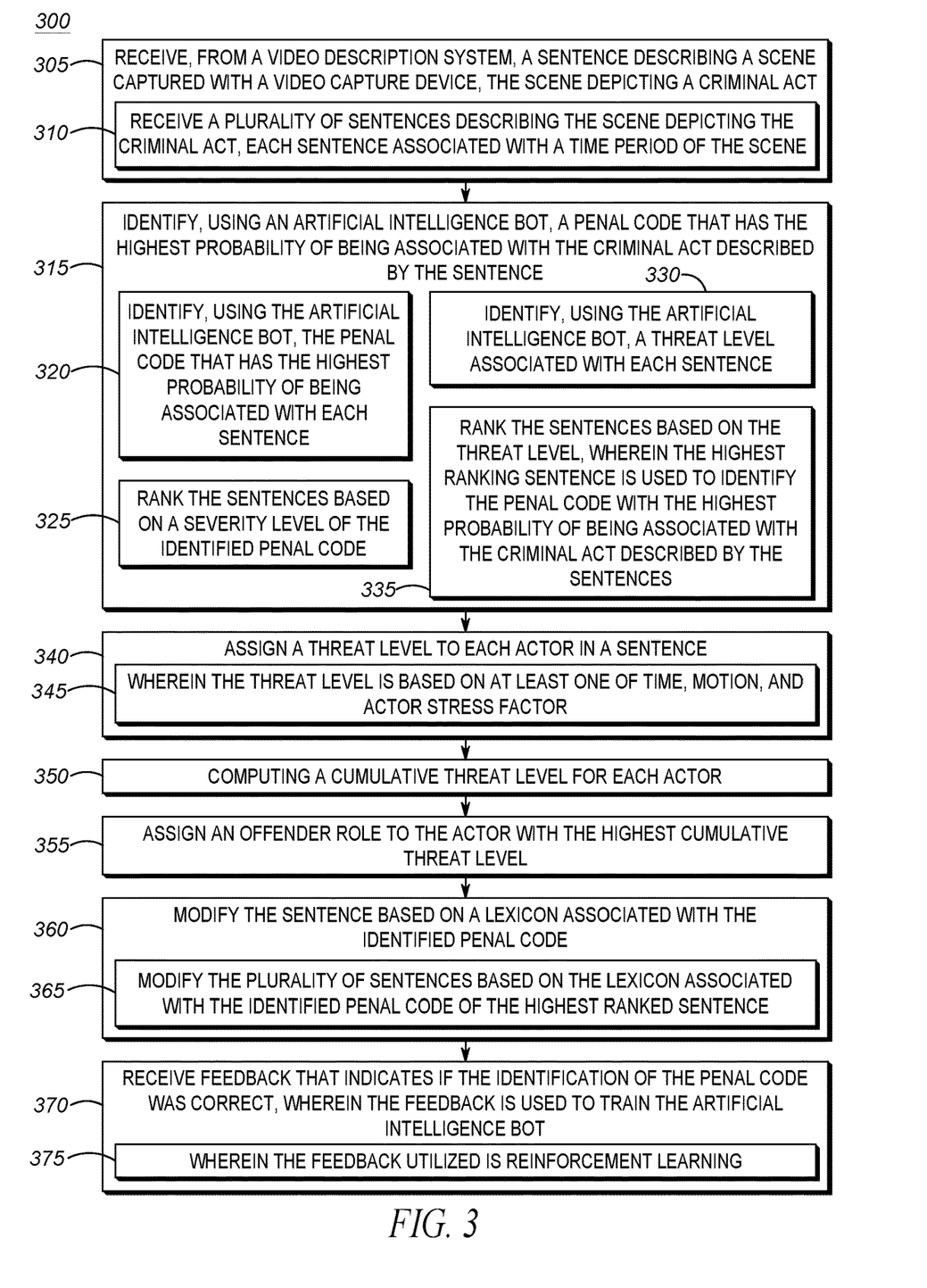
FIG. 3 is a high level block diagram of an example of the process of predicting a penal code and modifying annotations of a video segment according to the techniques described herein.

FIG. 3 is a high level block diagram 300 of an example of the process of predicting a penal code and modifying annotations of a video segment according to the techniques described herein. In block 305, a sentence describing a scene depicting a criminal act captured with a video capture device may be received from a video description system. The techniques described herein are not dependent on any particular video description system either currently available or developed in the future. What should be understood is that the contents of the video scene are automatically converted into a textual summary sentence of what is occurring in the scene, including the actors present, any actions those actors may be engaged in, and the relationships between the actors.

As shown in block 310, A plurality of sentences may be received that describe the scene depicting the criminal act. Each sentence may be associated with a time period of the scene. What should be understood is that a video scene may include different actions that occur during the duration of the video. The description of what is going on in the scene may change as time progresses. A sentence describing what is going on during each of the time periods may be received.

In block 315, an artificial intelligence bot may identify a penal code that has the highest probability of being associated with the criminal act described by the sentence. In other words, a sentence describing the scene may be compared to the penal code to determine which penal code violation is most likely to have occurred. The identification may use techniques such as matching words used in the sentence to words in the penal code, hyponyms of such words, hypernyms of such words, etc. Furthermore, as explained further below, the artificial intelligence bot will be continuously trained based on feedback from previous iterations.

In some cases, the selection of a sentence to be associated with a penal code is selected by examining all provided sentences. In block 320, using the artificial intelligence bot, the penal code that has the highest probability of being associated with each sentence may be identified. As explained in block 310, a plurality of sentences may be received. For each of those sentences, the penal code that is most likely associated with each sentence is determined. If only one sentence is provided, there will be only one penal code identified. If more than one sentence is provided, there will be one penal code identified for each sentence, although the same penal code could be associated with more than one sentence.

In block 325, the sentences may be ranked based on a severity level of the identified penal code. The penal code includes may different offenses, ranging from low level crimes, such as loitering, to very severe crimes, such as murder. By ranking the sentences based on the severity of the identified penal code, the most serious offense that is being described in the video scene may be selected. Doing so ensures that the most serious crime is what is focused on, and that the offender does not get charged with a less serious offense than he otherwise could have been charged.

In some implementations, the sentences may be ranked based on a threat level associated with each sentence. In block 330, the artificial intelligence bot may identify a threat level associated with each sentence. As explained in further detail below, the threat level may be used to identify how threatening each sentence is based on what is occurring in the description provided by the sentence. For example, a sentence including the word stab may have a higher threat level than a sentence including the word push.

In block 335, the sentences may be ranked based on the threat level, wherein the highest ranking sentence is used to identify the penal code with the highest probability of being associated with the criminal act described by the sentence. The highest ranked sentence would thus describe the most threatening portion of the description of the video. The highest ranking sentence may then be used to identify the associated penal code.

In block 340, a threat level may be assigned to each actor in a sentence. For example, the aggressor in a sentence could be assigned a higher threat level that the target of the aggression. It should be noted that the same actor could have a high threat level in one sentence but a low threat level in another sentence. For example, a person being kidnapped may fight back against the kidnapper, which may make them to appear to be the aggressor in that given sentence. In block 345, the threat level is based on at least one of time, motion, and actor stress factor. It should be understood that block 345 does not describe an exhaustive list.

In block 350, a cumulative threat level for each actor may be computed. In one example, this may be a simple aggregation of the threat levels of each actor over all sentences. In another example, this may be a weighted aggregation based on the severity of what is being described in the sentence. In block 355, an offender role may be assigned to the actor with the highest cumulative threat level. In other words, when looking at the sentences describing the entire video segment, the actor who poses the greatest threat overall may be considered to be the offender or aggressor. For example, if the identified penal code is kidnapping, and a person tagged as Person A has the highest threat level, Person A may then be identified as Kidnapper A. As should be understood, the specific labeling of the offender may change based on the lexicon used with the identified penal code.

In block 360, the sentence may be modified based on a lexicon associated with the identified penal code. As explained above, each penal code may use a slightly different lexicon. For example, depending on the penal code, the person violating the code may be referred to as an offender, an assailant, an aggressor, etc. By modifying the sentence to correspond with the lexicon of the identified penal code, the sentence may better correlate with what is depicted in the video. In block 365, the plurality of sentences maybe modified based on the lexicon associated with the identified penal code of the highest ranked sentence. As described above, a video scene may be described my multiple sentences, each describing a portion of the video. Using the ranking techniques described in block 315-335, a penal code that is most likely associated with the scene is identified. The lexicon associated with that penal code may then be used to modify each of the plurality of sentences.

In order to improve the performance of the artificial intelligence bot, the bot may receive feedback regarding the correctness of the penal code identification. In block 370, feedback that indicates if the identification of the penal code was correct may be received. The feedback may be used to train the artificial intelligence bot. In one example, as shown in block 375, the feedback utilized may be reinforcement learning, which is described in further detail below. However, it should be understood that any form of feedback training could be utilized with the techniques described herein.

Figure 4:
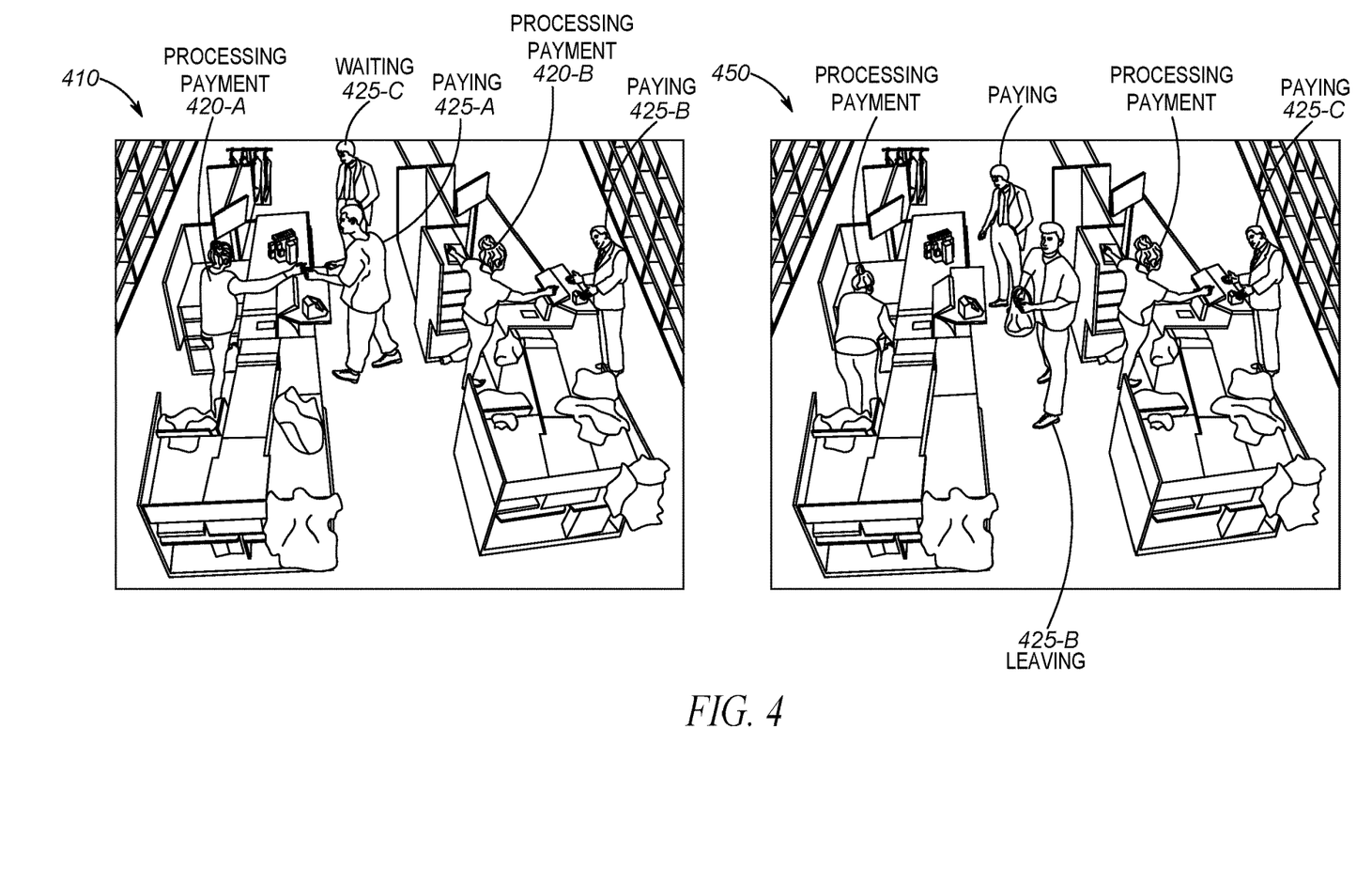
FIG. 4 is an example of a technique that may be used to determine when a new sentence should be started according to the techniques described herein.

FIG. 4 is an example of a technique that may be used to determine when a new sentence should be started according to the techniques described herein. As mentioned above, a video scene may be described using multiple sentences. The techniques described herein may determine that a new sentence begins based on various factors, including when a new and/or changed tag appears in the scene.

Scene 410 is an example of a still frame of a video segment. Using known techniques, a video descriptor system may identify objects within the scene and tag those objects. For example, in the scene 410, there are two clerks 420-A, 420-B that are currently processing payments. There are two corresponding customers 425-A, 425-B that are paying. There is a third customer 425-C that is waiting. A sentence describing this scene may be "Clerks A and B are taking payment from customers A and B while customer C waits."

At some point later in the video one of the customers A or B may finish their transaction. Assume customer B has now completed his transaction and is leaving the store. The video description system would now produce a different set of tags for this scene. Here, it would be Customer B leaving, while all other tags remain the same. The presence of a new tag (e.g. customer leaving), would trigger the system to begin a new sentence. For example, the new sentence may be, "Clerk A takes payment from customer A, Customer B is leaving, while customer C waits." What should be noted is that it is the change in tags that generates a new sentence, even if some of the existing tags remain the same.

In some implementations, the system may gather multiple tag changes before deciding to create a new sentence. For example, scene 450 depicts the scene where customer 425-B is now leaving aggregated with the change that customer 425-C is no longer waiting, but is now paying. The new newly generated sentence may be, "Clerks A and B are taking payment from customers A and C while customer B leaves."

Figure 5:
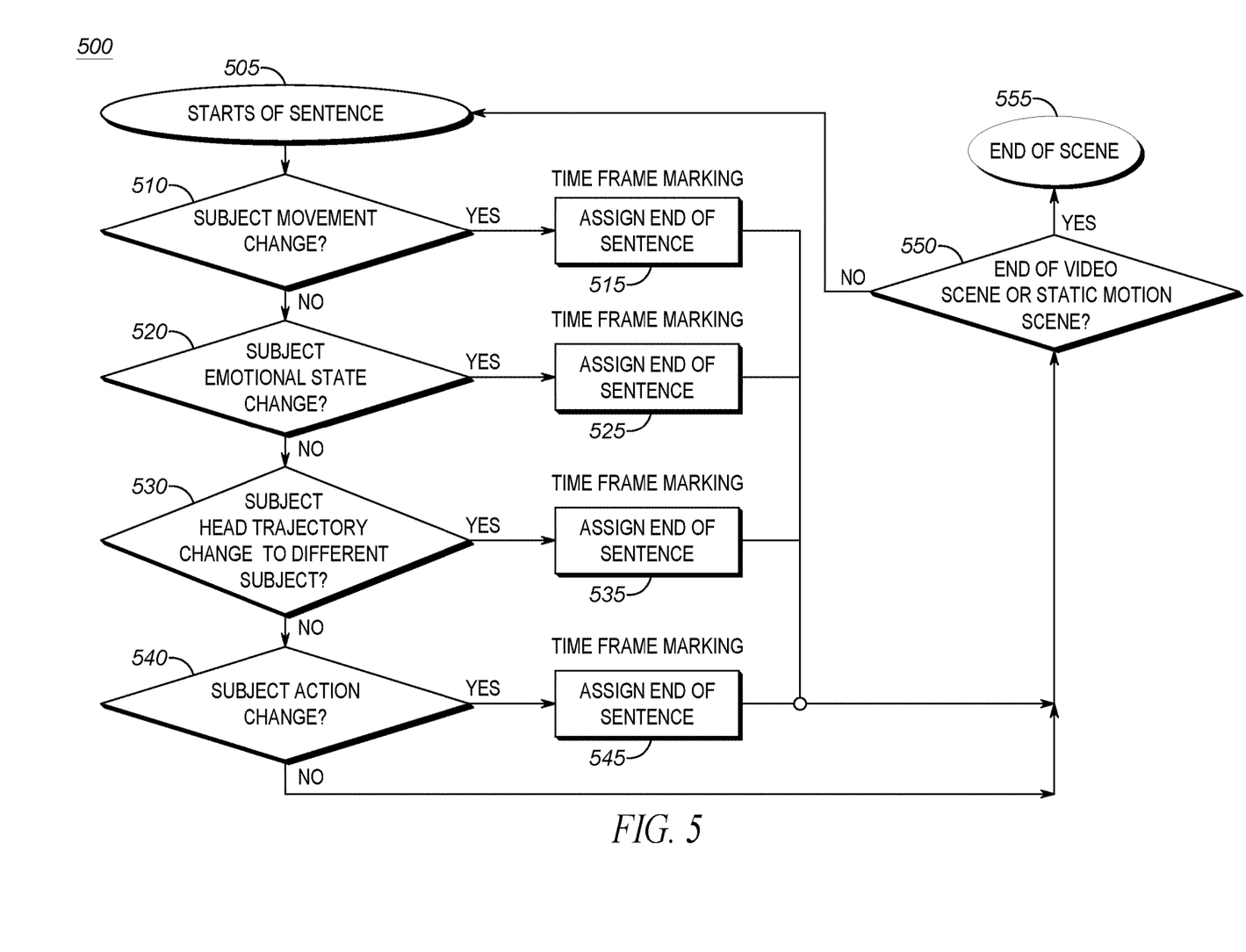
FIG. 5 is a high level block diagram of an example of other criteria that may be used to determine when a new sentence should be started according to the techniques described herein.

FIG. 5 is a high level block diagram 500 of an example of other criteria that may be used to determine when a new sentence should be started according to the techniques described herein.

The process starts in block 505 with the creation of a sentence describing the scene. The video is then monitored for changes in the scene. In block 510, it is determined if there is subject movement change. For example, if an actor stands up, sits down, enters, leaves, etc. If so, this indicates that the in progress sentence is over. The process moves to block 515, where the end of the sentence is assigned. The process then moves to block 550, which is described in further detail below.

If there is no change in subject movement in block 510, the process moves to block 520, where it is determined if there is a change in a subject's emotional state. For example, if a subject becomes angry, or sad, or some other change of emotional state. If there is a change in the subject's emotional state, the process moves to block 525, where the end of the sentence is assigned. The process then moves to block 550, which is described in further detail below.

If there is no change in subject emotional state in block 520, the process moves to block 530, where it is determined if there is a change in the subject's head trajectory to a different subject. For example, if a subject sees something in the scene, they may turn their head toward whatever it is they saw. This may indicate that the subject has now become aware of something they were not previously aware of. If there is a change in the subject head trajectory, the process moves to block 535, where the end of the sentence is assigned. The process then moves to block 550, which is described in further detail below.

If there is no change in the subject's head trajectory, the process moves to block 540 where it is determined if there is a subject action change. For example, the subject was walking but is now running. If there is a change in the subject action, the process moves to block 545 where the end of the sentence is assigned. The process then moves to block 550, which is described in further detail below.

It should be noted that when the end of the sentence is assigned, a timestamp may be recorded in order to show when in the video the various transitions occur. The timestamps may be used during playback of the video to ensure that the proper sentence is displayed in synchronization with the video playback.

In block 550, it is determined if it is the end of the video. In some cases, this may occur if there is no further video to view or if the scene in the video has remained static for some period of time. If it is the end of the video, the process moves to block 555 and ends. Otherwise the process returns to block 505 in which the sentence is created. The process then continues to look for additional changes, as described above.

Figure 6:
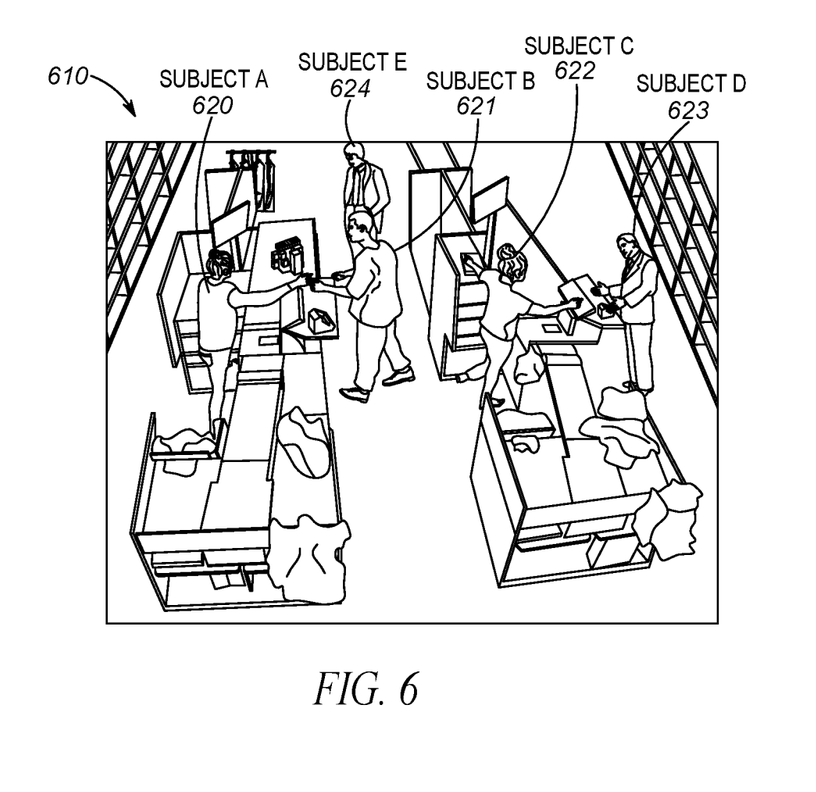
FIG. 6 is an example using the number of subjects in a scene to determine how many sentences are created.

FIG. 6 is an example using the number of subjects in a scene to determine how many sentences are created. FIG. 6 depicts a scene 610 with subjects A 620, B 621, C 622, D 623, and E 624. In some implementations, the number of sentences generated is based in part on the total number of subjects within the scene such that each subject is included in at least one sentence. It should be understood that this does not replace the sentence forming criteria previously described but rather is in addition to it. As shown, with five subjects depicted in FIG. 6, it would be expected that there would be at least 5 sentences. It should be noted that this number of sentences assumes there is no interaction between subjects. If the subjects interact, a single sentence may reference multiple subjects (e.g. Subject A hits Subject B) and as such each subject would not need an independent sentence.

Figure 7:
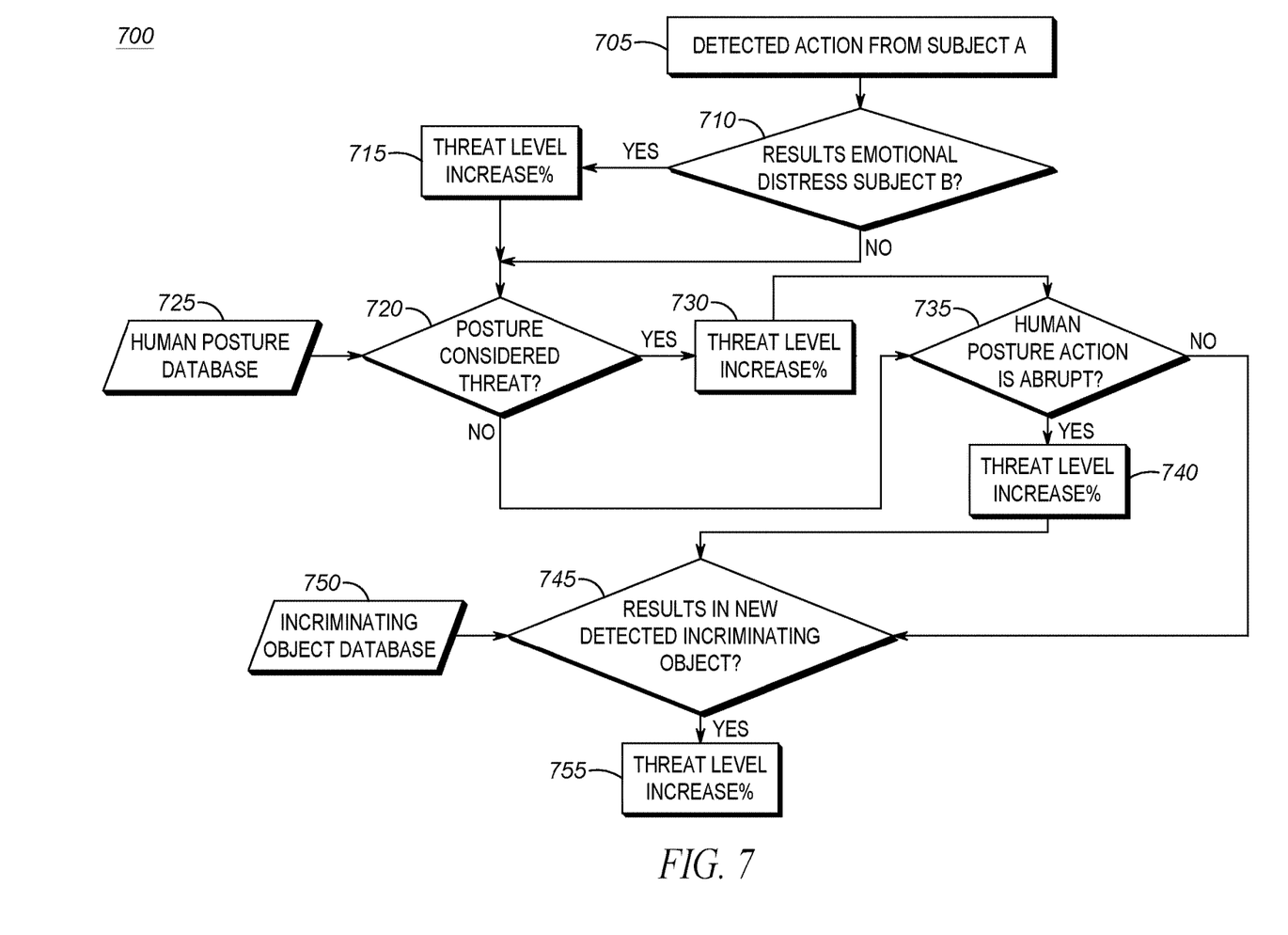
FIG. 7 is an example block diagram for determining a threat level according to the techniques described herein.

FIG. 7 is an example block flow diagram for determining a threat level according to the techniques described herein. Certain tags may automatically increase the threat level. For example, the presence of items such as guns or blood. In addition, the emotional distress levels experienced by the various actors may increase the threat level. As yet another example, abrupt, fast motion (e.g. hitting, stabbing, etc.) may also increase the threat level. Abrupt motion may be detected by comparing subsequent frames of the video and perform dissimilarity calculations. Large values (e.g. large amounts of dissimilarity between frames) may indicate rapid motion.

In flow diagram 700, at block 705, action from subject A may be detected. In block 710, it may be determined if that action results in emotional distress in subject B. For example, if person A grabs person B violently, this will likely result in person B experiencing emotional distress. The increased emotional distress may indicate a greater threat level. In block 715, the threat level percentage may be increased. If there is no emotional distress caused in subject B, the process moves to block 720.

In block 720, it can be determined if the posture of subject A is considered a threat. For example, a human posture database 725 may be accessed to determine if the posture of subject A is considered a threatening posture. Some examples of human posture databases are PoseNet, Open Pose, or Learnable Triangulation, which are deep learning databases. If it is determined that the posture of subject A is considered a threat, the process moves to block 730, in which the threat level percentage is increased. The process moves to block 735.

In block 735, it may be determined if the posture of subject A experienced an abrupt action. As explained above, abrupt action may indicate an increased threat level. If it is determined that the was an abrupt action, the process move to block 740 wherein the threat level percentage is increased. The process then moves to block 745.

In block 745, it is determined if there are any incriminating objects in the scene. These objects may be stored in incriminating object database 750. Examples of incriminating objects may include blood, drugs, weapons, etc. If any of those incriminating objects are detected, the process moves to block 755 where the threat level percentage is increased.

Figure 8:
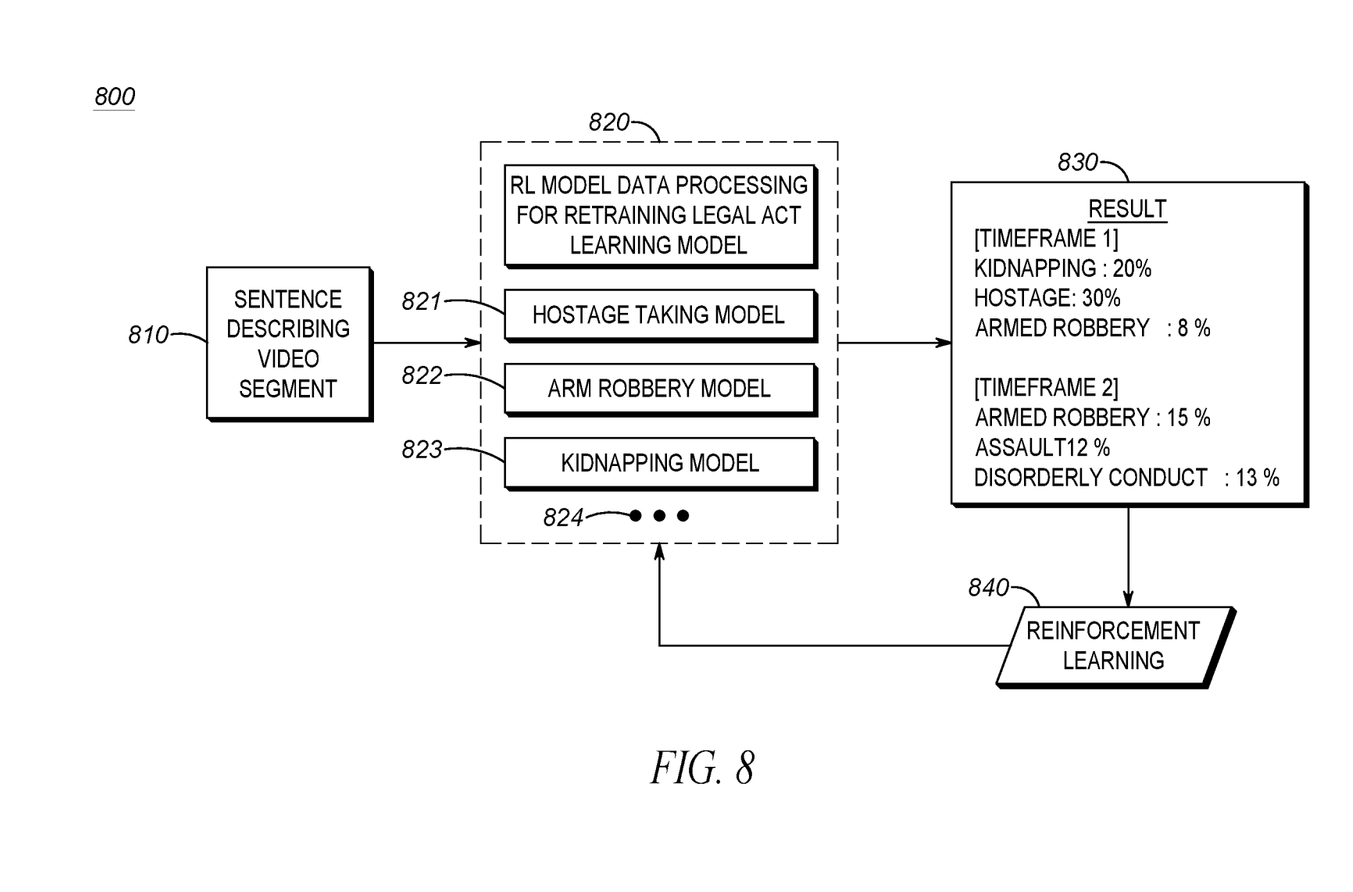
FIG. 8 is a high level flow diagram of an example of a reinforcement learning techniques that may be utilized with the techniques described herein.

FIG. 8 is a high level flow diagram 800 of an example of a reinforcement learning techniques that may be utilized with the techniques described herein. A sentence describing the video segment 810 are sent to the artificial intelligence bot 820. The artificial intelligence bot may be implemented with a computing device, such as the one shown with respect to FIG. 9. The Artificial intelligence bot may then run the sentence through a model generated for each possible violation of the penal code. As shown, there is a hostage taking model 821, an armed robbery model 822, a kidnapping model 823, and any number of other models 824 representing all possible penal code violations.

These model are then used to determine the probability that the particular sentence is describing an offense associated with that penal code. For example, the model may use Word Sense Disambiguation (WSD) for information similarity, word similarity, subject similarity, or any number of other WSD methods to determine the likelihood that the particular penal code has been violated. In block 830, the results may be presented. In one example implementation, each timeframe in the video is processed separately to provide a probability of the penal code being violated for each time period. In some implementations, the highest probability over all time periods is selected as the most likely penal code that has been violated.

At some point, a determination is made as if the correct penal code was selected. This determination can come from a suspect being charged with the penal code violation, convicted of the violation, human review of the selected violation, or any other way of determining what the actual violation was. In block 840, this feedback can be sent to the artificial intelligence bot 820 in order to retrain the models. In one example implementation, reinforcement learning is used to retrain the model. Reinforcement learning involves providing the artificial intelligence bot a reward for correct selection of the penal code. An incorrect selection results in no reward. Although reinforcement learning has been mentioned, it should be understood that the techniques described herein are in no way limited to any specific form of training.

Figure 9:
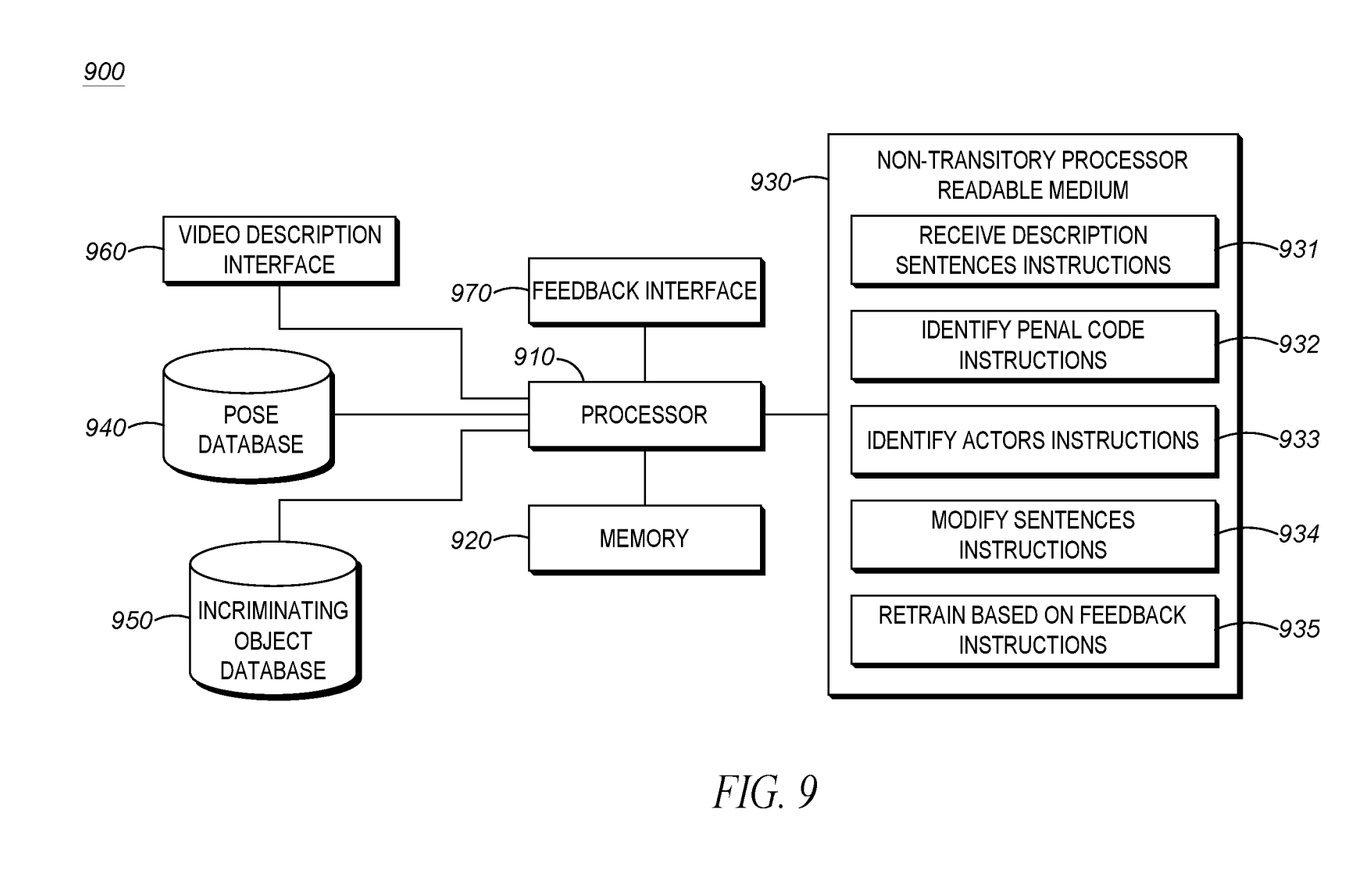
FIG. 9 is an example of a device that may implement the predicting a penal code and modifying an annotation based on the prediction techniques described herein.

FIG. 9 is an example of a device that may implement the predicting a penal code and modifying an annotation based on the prediction techniques described herein. It should be understood that FIG. 9 represents one example implementation of a computing device that utilizes the techniques described herein. Although only a single processor is shown, it would be readily understood that a person of skill in the art would recognize that distributed implementations are also possible. For example, the various pieces of functionality described above (e.g. penal code identification, sentence modification, etc.) could be implemented on multiple devices that are communicatively coupled. FIG. 9 is not intended to imply that all the functionality described above must be implemented on a single device.

Device 900 may include processor 910, memory 920, non-transitory processor readable medium 930, Pose database 940, incriminating object database 950, video description interface 960, and feedback interface 970.

Processor 910 may be coupled to memory 920. Memory 920 may store a set of instructions that when executed by processor 910 cause processor 910 to implement the techniques described herein. Processor 910 may cause memory 920 to load a set of processor executable instructions from non-transitory processor readable medium 930. Non-transitory processor readable medium 930 may contain a set of instructions thereon that when executed by processor 910 cause the processor to implement the various techniques described herein.

For example, medium 930 may include receive description sentences instructions 931. The receive description sentences instructions may cause the processor to receive sentences describing a video scene from a video description system via video description interface 960. As mentioned above, the techniques described herein are not dependent on any particular type of video description system, and would be usable with any currently available or later developed video description system. The receive description sentences instructions 931 are described throughout this description generally, including places such as the description of blocks 305-310.

Medium 930 may also include identify penal code instructions 932. The identify penal code instructions may cause the processor to identify, based on the sentence descriptions, the most likely penal code that has been violated. In some cases, as described above with respect to FIG. 7, the processor may make use of poses stored in pose database 940 or incriminating objects stored in incriminating object database 950. The identify penal code instructions 932 are described throughout this description generally, including places such as the description of blocks 315-335.

Medium 930 may also include identify actors instructions 933. The include identify actors instructions may cause the processor to examine the actors in a scene to determine which actors are the aggressors and which ones are the victims. The identify actors instructions may also make use of poses stored in pose database 940 or incriminating objects stored in incriminating object database 950. The identify actors instructions 933 are described throughout this description generally, including places such as the description of blocks 340-355.

Medium 930 may also include modify sentence instructions 934. The modify sentence instructions may cause the processor to modify the sentences received via the video description interface 960 based on a lexicon associated with the penal code identified from the identify penal code instructions 933. The modify sentence instructions 934 are described throughout this description generally, including places such as the description of blocks 360-365.

Medium 930 may also include retrain based on feedback instructions 935. The retrain based on feedback instructions may cause the processor to receive, via feedback interface 970, and indication if the penal code identified via identify penal code instructions 932, was correct or incorrect. The models used to identify the penal code that was violated may then be retrained based on this feedback. In some cases, the training is based on reinforcement learning. The retrain based on feedback instructions 935 are described throughout this description generally, including places such as the description of blocks 370-375.

As should be apparent from this detailed description, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot [include a particular function/feature from current spec], among other features and functions set forth herein).

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending in the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through an intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method comprising:
receiving, from a video description system, a sentence describing a scene captured with a video capture device, the scene depicting a criminal act;
identifying, using an artificial intelligence bot, a penal code that has the highest probability of being associated with the criminal act described by the sentence;
modifying the sentence based on a lexicon associated with the identified penal code;
receiving feedback that indicates if the identification of the penal code was correct, wherein the feedback is used to train the artificial intelligence bot;
receiving a plurality of sentences describing the scene depicting the criminal act, each sentence associated with a time period of the scene;
identifying, using the artificial intelligence bot, a threat level associated with each sentence;
ranking the sentences based on the threat level, wherein the highest ranking sentence is used to identify the penal code with the highest probability of being associated with the criminal act described by the sentence; and
modifying the plurality of sentences based on the lexicon associated with the highest ranked sentence.

2. The method of claim 1 wherein the feedback utilized is reinforcement learning.

3. The method of claim 1 further comprising:
receiving a plurality of sentences describing the scene depicting the criminal act, each sentence associated with a time period of the scene;
identifying, using the artificial intelligence bot, the penal code that has the highest probability of being associated with each sentence;
ranking the sentences based on a severity level of the identified penal code; and
modifying the plurality of sentences based on the lexicon associated with the identified penal code of the highest ranked sentence.

4. The method of claim 1 further comprising:
assigning a threat level to each actor in a sentence;
computing a cumulative threat level for each actor; and
assigning an offender role to the actor with the highest cumulative threat level.

5. The method of claim 4 wherein the threat level is based on at least one of time, motion, and actor stress factor.

6. A system comprising:
a processor;
a memory coupled to the processor, the memory containing a set of instructions thereon that when executed by the processor cause the processor to:
receive, from a video description system, a sentence describing a scene captured with a video capture device, the scene depicting a criminal act;
identify, using an artificial intelligence bot, a penal code that has the highest probability of being associated with the criminal act described by the sentence;
modify the sentence based on a lexicon associated with the identified penal code;
receive feedback that indicates if the identification of the penal code was correct, wherein the feedback is used to train the artificial intelligence bot;

receive a plurality of sentences describing the scene depicting the criminal act, each sentence associated with a time period of the scene;

identify, using the artificial intelligence bot, a threat level associated with each sentence;

rank the sentences based on the threat level, wherein the highest ranking sentence is used to identify the penal code with the highest probability of being associated with the criminal act described by the sentence; and modify the plurality of sentences based on the lexicon associated with the highest ranked sentence.

7. The system of claim 6 wherein the feedback utilized is reinforcement learning.

8. The system of claim 6 further comprising instructions to:

receive a plurality of sentences describing the scene depicting the criminal act, each sentence associated with a time period of the scene;

identify, using the artificial intelligence bot, the penal code that has the highest probability of being associated with each sentence;

rank the sentences based on a severity level of the identified penal code; and modify the plurality of sentences based on the lexicon associated with the identified penal code of the highest ranked sentence.

9. The system of claim 6 further comprising instructions to:

assign a threat level to each actor in a sentence;

compute a cumulative threat level for each actor; and assign an offender role to the actor with the highest cumulative threat level.

10. The system of claim 9 wherein the threat level is based on at least one of time, motion, and actor stress factor.

11. A non-transitory processor readable medium containing a set of instructions thereon that when executed by a processor cause the processor to:

receive, from a video description system, a sentence describing a scene captured with a video capture device, the scene depicting a criminal act;

identify, using an artificial intelligence bot, a penal code that has the highest probability of being associated with the criminal act described by the sentence;

modify the sentence based on a lexicon associated with the identified penal code;

receive feedback that indicates if the identification of the penal code was correct, wherein the feedback is used to train the artificial intelligence bot;

receive a plurality of sentences describing the scene depicting the criminal act, each sentence associated with a time period of the scene;

identify, using the artificial intelligence bot, a threat level associated with each sentence;

rank the sentences based on the threat level, wherein the highest ranking sentence is used to identify the penal code with the highest probability of being associated with the criminal act described by the sentence; and modify the plurality of sentences based on the lexicon associated with the highest ranked sentence.

12. The medium of claim 11 wherein the feedback utilized is reinforcement learning.

13. The medium of claim 11 further comprising instructions to:

receive a plurality of sentences describing the scene depicting the criminal act, each sentence associated with a time period of the scene;

identify, using the artificial intelligence bot, the penal code that has the highest probability of being associated with each sentence;

rank the sentences based on a severity level of the identified penal code; and modify the plurality of sentences based on the lexicon associated with the identified penal code of the highest ranked sentence.

14. The medium of claim 11 further comprising instructions to:

assign a threat level to each actor in a sentence;

compute a cumulative threat level for each actor; and assign an offender role to the actor with the highest cumulative threat level.

15. The medium of claim 14 wherein the threat level is based on at least one of time, motion, and actor stress factor.

* * * * *